UNITED STATES PATENT OFFICE.

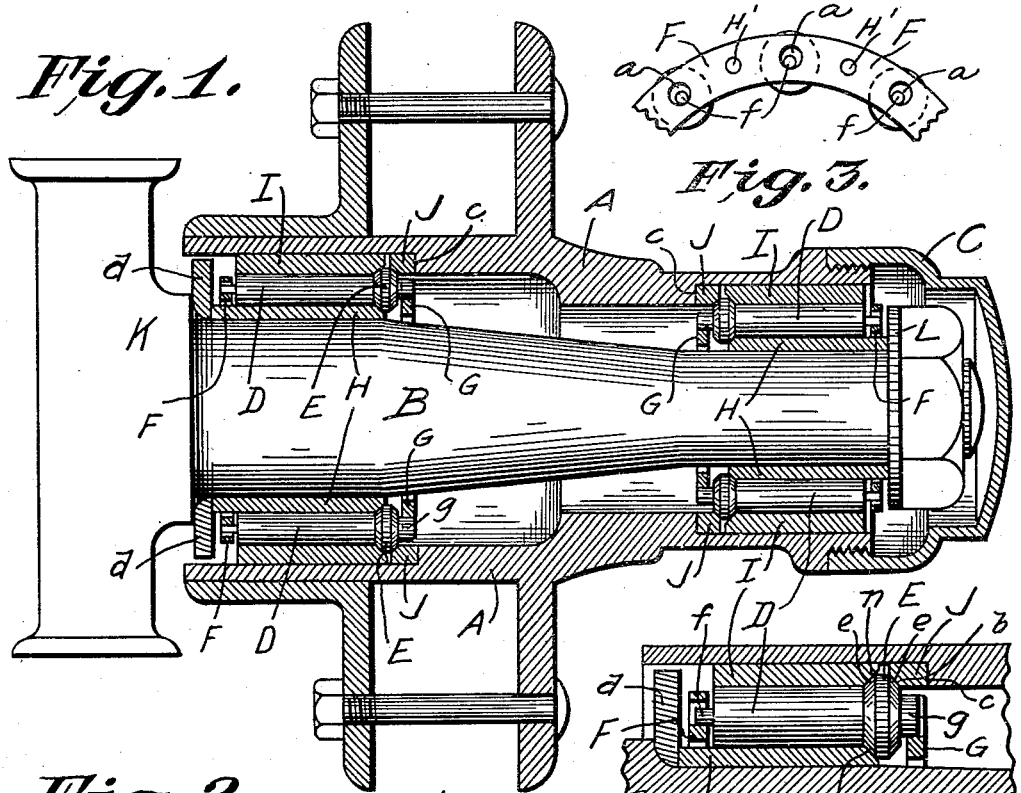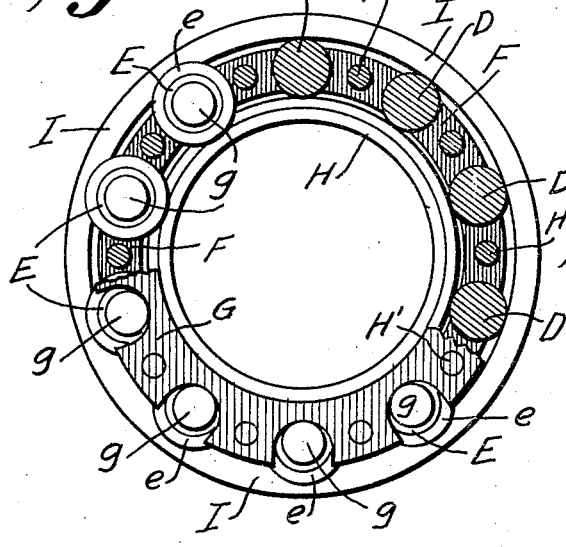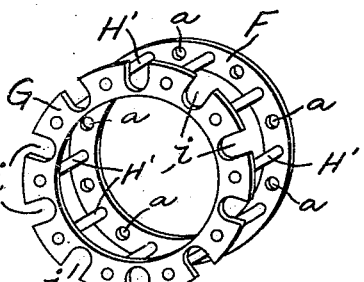

ROBERT F. BOWER, OF DAYTON, OHIO.

ROLLER-BEARING.

No. 907,678.

Specification of Letters Patent.

Patented Dec. 22, 1908.

Application filed December 16, 1907. Serial No. 406,623.

*To all whom it may concern:*

Be it known that I, ROBERT F. BOWER, citizen of the United States, residing at Dayton, in the county of Montgomery and State of Ohio, have invented certain new and useful Improvements in Roller-Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in roller or anti-friction bearings, and comprises certain structural features and advantages hereinafter more fully described.

The objects of the invention are several, principally among which is to provide a perfect end-thrust roller bearing in which the end thrust from either side is substantially met and taken. And further, to provide a bearing of the above type from which one or more rollers may be removed without disturbing the other rollers or disconnecting the parts of the supporting frame or cage.

Preceding a more detailed description of the invention, reference is made to the accompanying drawings, of which—

Figure 1, is a longitudinal sectional view of an automobile hub with spindle therein, and in which my improved bearing is placed in double series. Fig. 2, is an end view of the bearing removed, part of one of the supporting rings being broken away and some of the rollers appearing in section. Fig. 3 is a detail view of the outer supporting ring for the rollers. Fig. 4, is an enlarged detail sectional view of one of the rollers in position. Fig. 5, is a detail view in perspective, of the supporting frame or cage.

In a detailed description of the invention, similar reference characters indicate corresponding parts.

For the purposes of describing and illustrating my improved bearing, I show in the drawings a well-known form of automobile hub A and an automobile spindle or axle B with a cap nut C inclosing the end of the spindle in a well-known manner. In this figure of the drawings, there are illustrated two sets of bearings and a detail description of one is a description of the other, and I desire further to state that the bearing is not alone confined to automobile spindles, but may be utilized wherever a bearing of this type may be used.

D designates a series of rollers each of which has an enlargement E with inner and outer tapering surfaces $e$. The ends of these rollers are provided with journals $f$ and $g$ the former being smaller than the latter, and the larger journals $g$ being on the ends of the rollers on which the enlargements E are located. These enlargements E are for the purpose of taking and meeting the end thrusts from either side. The rollers so formed are supported in a circle in the cage shown in Fig. 5, which is made up of rings F and G which are united by a series of cross rods H'. The ring G is provided with a suitable number of slots $i$ extending inwardly a suitable distance from the periphery of the ring. These slots $i$ are of sufficient size to receive the larger journals $g$ of the rollers. The ring F has a series of smaller openings $a$ in alinement with the larger openings $i$ in the ring G. The openings $a$ are somewhat larger in diameter than the smaller journals $f$ of the rollers as is more clearly shown in Fig. 3, in order that each individual roller may be removed from the cage without detaching any part thereof. In assembling the rollers in this supporting frame or cage, the smaller journals are inserted in said openings $d$ and the rollers are dropped into position by the larger journals $g$ entering the openings $i$.

Coming now to an important feature of my improved roller bearing which coöperates with the double tapered enlargements E, of the rollers, H and I designate, respectively, inner and outer bearing sleeves which inclose the rollers D and which in conjunction with said rollers, form the anti-friction bearing. The inner ends of these sleeves have tapering surfaces $m$ and $n$ which match the tapering surface $e$ on one side of the roller enlargements and engage said tapering surfaces snugly.

J is an end-thrust ring in alinement with the outer bearing ring I and having a tapered surface $b$ matching the tapered surface $e$ on the roller enlargements and in engagement with said surface.

It will be seen that the enlargements of the rollers are inclosed on the outer side of the bearing between these two tapered surfaces $n$ and $b$, and that such points of contact extend throughout the length or width of said tapered surfaces and thus provide a substantial engagement between the roller enlargements and the outer bearing ring I and the end thrust ring J. The same is true of the tapering surface m on the end of the inner bearing sleeve H, such tapering surface engaging the length or width of the tapering surface of the enlargements on the inside of the rollers. The end thrust ring J is held by a shoulder c on the interior of the hub, while the inner bearing sleeve H is held by a collar d surrounding the axle or spindle B.

From the foregoing description, it will be apparent that a most substantial means is here provided for taking the end thrust from either side of the bearing, and owing to the matching and engaging tapered surfaces e m n b, the wear will be uniform throughout the engaging surfaces.

As before stated, Fig. 1 illustrates two sets of bearings in connection with an automobile spindle. From this illustration of such an application of my improved bearing, it will be seen that an inward end thrust will be exerted upon the inner sleeve H and the outer ring J through the tapered surfaces of the roller enlargements, and will be met by the hub A through the engaging shoulder c. The force thus exerted inwardly upon the hub will be transmitted to the end thrust ring J of the inner set of bearings and thence to the inner bearing sleeve H to be met by the collar d on the inner portion of the spindle. An outward end thrust will be transmitted in a similar manner and will be borne by the collar L on the outer end of the spindle.

While I have shown and described the cage with the inner ring G provided with the larger journal openings i, it will be understood that the larger openings may be made in the inner ring without extending them to the periphery of the ring, and that the smaller openings a in the outer ring may be extended to the periphery of said ring in order that the smaller roller journals f may be dropped into position in said outer ring after the larger roller journals g have been inserted in the openings in the inner ring.

Having described my invention, I claim:

In a bearing of the type specified, a series of rollers having enlargements with oppositely-disposed tapered surfaces, and journals projecting from the ends of said rollers, a cage comprising two united rings with suitable openings therein, the openings in one of said rings being adapted to receive the journals on one end of the rollers by a longitudinal movement of each roller, and the openings on the other of said rings being adapted to receive the journals on the other end of the rollers by a lateral movement of the rollers, an inner bearing sleeve within the cage and engaging the inner sides of the rollers, said inner bearing sleeve having its inner end tapered and engaging the tapered surfaces on the outer sides of the roller enlargements, an outer bearing sleeve for said rollers, the inner end of which is tapered and engages the outer tapered surfaces of the roller enlargements, and an end-thrust ring having a tapered surface engaging the inner tapered surfaces of the roller enlargements, said end-thrust ring being in alinement with the outer bearing ring.

In testimony whereof I affix my signature, in presence of two witnesses.

ROBERT F. BOWER.

Witnesses:
CAROLYN M. THEOBALD,
MATTHEW SIEBLER.